3,336,398
THERMAL REACTION OF DIENES WITH PHENOLS TO PRODUCE UNSATURATED ALKYL PHENOLS
Albert B. Booth, Jekyll Island, Ga., assignor to Hercules Incorporated, a corporation of Delaware
No Drawing. Filed Feb. 24, 1964, Ser. No. 346,999
9 Claims. (Cl. 260—619)

This invention relates to phenolic resins and, more particularly, to polymeric resinous condensates of phenols and dicyclopentadiene and to the method for their preparation.

In accordance with the present invention, phenolic resins are produced by heating an alkylatable phenol and dicyclopentadiene in the absence of a catalyst at a temperature in the range of about 200–260° C.

The phenolic resin produced in this manner appears to be a polymer produced by alkylation through the difunctionality of the two double bonds in the dicyclopentadiene and the alkylatable positions in the phenol. The phenols which are operable are phenol and m- and p-alkyl or halogen substituted phenols having at least one unsubstituted ortho position, such as the cresols, isopropyl phenols, t-butyl phenols, xylenols, m- and p-chlorocresols, m- and p-bromocresols, and m- and p-halophenols, or mixtures of any of these phenols. The dicyclopentadiene may be used in the monomeric or dimeric form since the monomeric form dimerizes reversibly at the temperature of the condensation and the product appears to be a dicyclopentadiene reaction product.

The phenolic resin of this invention has a molecular weight in the range of about 300 to 400 and contains at least two phenol units and at least one dicyclopentadiene unit per molecule and is free of cyclic ether groups. The phenol unit is believed to be attached to the dicyclopentadiene unit at the ortho positions and at least part of the dicyclopentadiene units are attached to two phenol units. The phenolic resin is thus believed to be an alkylation product which in part consists of a chain of alternating phenol and dicyclopentadiene units. The phenolic resin is not produced in the catalytic reaction between dicyclopentadiene and phenols since alkylation catalysts produce alkylation products having cyclic ether units. The phenolic resin of the present invention has a phenolic hydroxyl group for each phenol group introduced and is free of cyclic ether groups.

In carrying out the process of this invention, the phenol and the dicyclopentadiene are heated at about 200–260° C. and substantially equal molecular proportions undergo reaction. The phenol may be added to the dicyclopentadiene in substantially equal molecular amounts or in excess and heated until reaction is complete. The heating may be carried out under reflux, and with or without pressure, or in an autoclave to prevent loss of dicyclopentadiene. Alternatively, the phenol may be heated and the dicyclopentadiene added until no further reaction takes place or dicyclopentadiene can be heated and phenol added thereto in the proper amount with heating until reaction is complete. Any excess of either the phenol or cyclopentadiene can be removed by heating in vacuo with or without inert gas or steam sparging. The phenolic resins of this invention are particularly useful stabilizers for polyolefin polymers.

The preparation of typical phenolic resins of this invention is illustrated by the following examples wherein all parts and percentages are by weight.

*Example 1*

A mixture of 276 parts (2.06 moles) dicyclopentadiene and 376 parts (4.0 moles) phenol was heated for 12 hours at gradually increasing temperatures up to 200° C. in an autoclave under autogenous pressure. After cooling, the product was subjected to vacuum distillation at a pot temperature up to 250° C. to remove excess phenol. The residue of this distillation amounting to 384 parts was a soft resinous material which analyzed 6.32% phenolic OH; hydrogen absorption per 100 grams=0.381 mole. Infrared examination of the resinuous material showed: an intense band at 13.3 microns characteristic of an ortho substituted benzene ring; a very weak band at about 12 microns showing a small amount of para substituted materials; bands at about 8.4 and 2.8 microns characteristic of the phenolic OH of ortho substituted phenols. The molecular weight was about 270. The dicyclopentadiene/phenol ratio ($D/p$) was about 1.3.

*Example 2*

Example 1 was repeated except for heating at 240° C. From 652 parts of starting reagents, 618 parts were recovered and 288 parts phenol and 5 parts hydrocarbon were distilled from this, leaving a resinous residue of 373 parts. This phenolic resin showed, on analysis, 5.96% phenolic OH; hydrogen absorption per 100 grams=0.38 mole; and average molecular weight 361.

*Example 3*

To a stainless steel autoclave was charged 272 parts dicyclopentadiene and 432 parts p-cresol. This mixture was heated under autogenous pressure at 200–240° C. for 16 hours and then cooled to room temperature. The product was subjected to vacuum distillation at a temperature up to 250° C. to remove 248 parts p-cresol. The residue from the distillation was a resinous phenolic product having a drop softening point of 100° C. Titration with tetrabutyl ammonium hydroxide, using a potentiometric end point, showed 5.57% phenolic hydroxyl. The molecular weight was 361. Infrared examination of the product showed a characteristic strong band at 12.4 microns, indicative of para methyl substituent in the ring, and a strong maxima at 8.45 and 2.8 microns, indicative of a phenol with ortho substituents.

A sample of this resin was hydrogenated to saturate the ethylenic unsaturation and this hydrogenated resin, as well as the unhydrogenated resin, was found to be a good stabilizer for polypropylene film. The dicyclopentadiene/cresol ratio was about 1.3.

*Example 4*

A product similar to that of Example 3 was obtained by substitution of p-chlorophenol for p-cresol in that example.

The products of this invention are ortho phenolic substitution products of mixed chain length. The simplest component derived from dicyclopentadiene and phenol would be $C_{10}H_{12} \cdot C_6H_5OH$, which may be further abbreviated: D·P. The next higher molecular weight members are D·P·D, an o-disubstituted phenol, and P·D·P, a dicyclopentadienediphenol. The high molecular weight members of this series are D·P·D·P and D·P·D·P·D. In the case where P is p-cresol, the relative proportions of these components was 10:60:10:20.

The products of this invention, as well as the hydrogenation products thereof, have phenolic hydroxyl groups and they are all excellent stabilizers for polyolefins when used alone or with esters of thiodialkylcarboxylic acid, such as diethyl thiodipropionate. They are particularly useful as stabilizers for polypropylene.

What I claim and desire to protect by Letters Patent is:
1. The method for producing a polymeric phenolic resin which comprises heating an ortho-alkylatable phenol and dicyclopentadiene in the absence of a catalyst at a temperature of about 200–260° C.

2. The method of claim 1 in which the phenol is phenol.

3. The method of claim 1 in which the phenol is p-cresol.

4. The method of claim 1 in which the phenol is m-cresol.

5. The method of claim 1 in which the phenol is p-t-butyl phenol.

6. The method of claim 1 in which the phenol is p-chlorophenol.

7. A phenolic resin having an average molecular weight in the range of about 300 to about 400, produced by reacting substantially equal molecular amounts of at least one ortho-alkylatable phenol of the group consisting of phenol, cresols, isopropylphenols, t-butylphenols, xylenols, m- and p-halophenols and m- and p-halocresols, where halo is chloro or bromo, and dicyclopentadiene in the absence of a catalyst, at a temperature of about 200–260° C.

8. A phenolic resin having an average molecular weight in the range of about 300 to about 400, produced by reacting substantially equal molecular amounts of phenol and dicyclopentadiene in the absence of a catalyst at a temperature of about 200–260° C.

9. A phenolic resin having an average molecular weight in the range of about 300 to about 400, produced by reacting substantially equal molecular amounts of p-cresol and cyclopentadiene in the absence of a catalyst at a temperature of about 200–260° C.

References Cited

UNITED STATES PATENTS 2,864,868   12/1958   Bader _____ 260—619 X

LEON ZITVER, *Primary Examiner.*

D. M. HELPER, H. ROBERTS, *Assistant Examiners.*